(12) United States Patent
Balasubramanian et al.

(10) Patent No.: US 7,734,951 B1
(45) Date of Patent: Jun. 8, 2010

(54) SYSTEM AND METHOD FOR DATA PROTECTION MANAGEMENT IN A LOGICAL NAMESPACE OF A STORAGE SYSTEM ENVIRONMENT

(75) Inventors: Shankar Balasubramanian, Bangalore (IN); K. Uday Kishore, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 463 days.

(21) Appl. No.: 11/384,710

(22) Filed: Mar. 20, 2006

(51) Int. Cl.
*G06F 11/00* (2006.01)

(52) U.S. Cl. .............. 714/6; 714/4; 714/8; 714/15; 707/202

(58) Field of Classification Search .............. 714/4, 714/6, 8, 15; 707/202
See application file for complete search history.

(56) References Cited

U.S. PATENT DOCUMENTS

| | | | |
|---|---|---|---|
| 5,163,131 A | | 11/1992 | Row et al. |
| 5,819,292 A | | 10/1998 | Hitz et al. |
| 5,963,962 A | | 10/1999 | Hitz et al. |
| 6,449,731 B1 | * | 9/2002 | Frey, Jr. .......................... 714/9 |
| 6,574,591 B1 | | 6/2003 | Kleiman et al. |
| 6,604,118 B2 | | 8/2003 | Kleiman et al. |
| 6,668,264 B1 | | 12/2003 | Patterson et al. |
| 6,868,417 B2 | | 3/2005 | Kazar et al. |
| 6,889,228 B1 | | 5/2005 | Federwisch et al. |
| 6,915,316 B1 | | 7/2005 | Patterson et al. |
| 6,993,539 B2 | | 1/2006 | Federwisch et al. |
| 7,007,046 B2 | | 2/2006 | Manley et al. |
| 7,010,553 B2 | | 3/2006 | Chen et al. |
| 7,039,663 B1 | | 5/2006 | Federwisch et al. |
| 7,043,485 B2 | | 5/2006 | Manley et al. |
| 7,203,796 B1 | | 4/2007 | Muppalaneni et al. |
| 7,225,204 B2 | | 5/2007 | Manley et al. |
| 7,293,194 B2 | * | 11/2007 | Kawamura et al. .............. 714/7 |
| 7,325,109 B1 | | 1/2008 | Muppalaneni et al. |
| 7,366,858 B2 | * | 4/2008 | Berkowitz et al. .......... 711/162 |
| 7,587,422 B2 | * | 9/2009 | Wong et al. .............. 707/104.1 |
| 7,590,807 B2 | | 9/2009 | McGovern et al. |
| 2002/0049883 A1 | | 4/2002 | Schneider et al. |
| 2004/0030668 A1 | | 2/2004 | Pawlowski et al. |
| 2004/0078397 A1 | * | 4/2004 | Mehta et al. ................. 707/202 |

(Continued)

OTHER PUBLICATIONS

Bitton, Dina, Disk Shadowing, Proceedings of the 14.sup.th VLDB Conference, LA, CA (1988), 8 pages.

Federwisch et al. "System and Method for Determining Changes in Two Snapshots and for Transmitting Changes to a Destination Snapshot", filed Jan. 20, 2006 as U.S. Appl. No. 11/336,021, 70 pages.

(Continued)

*Primary Examiner*—Emerson C Puente
*Assistant Examiner*—Charles Ehne
(74) *Attorney, Agent, or Firm*—Cesari and McKenna LLP (57) ABSTRACT

A system and method for data protection in a logical namespace of a storage system environment is provided. An integrated management framework implements a data protection technique that monitors failures in the logical namespace at a managed data object granularity, e.g., a share. In the event of a failure to the data object, e.g., a primary share, the data protection technique enables automatic failover for a link point to the object (primary share) that is protected by a backup copy of the data object, e.g., a secondary share. That is, the data protection technique enables failover from the primary share to a secondary share and corresponding linking of the secondary share to the link point in the logical namespace.

24 Claims, 7 Drawing Sheets

U.S. PATENT DOCUMENTS

| | | | |
|---|---|---|---|
| 2004/0172421 | A1* | 9/2004 | Saito et al. .................. 707/200 |
| 2006/0015764 | A1* | 1/2006 | Ocko et al. ..................... 714/4 |
| 2006/0053178 | A1* | 3/2006 | van Ingen et al. ........... 707/204 |
| 2006/0129614 | A1* | 6/2006 | Kim et al. ................... 707/202 |
| 2006/0184587 | A1 | 8/2006 | Federwisch et al. |
| 2006/0218210 | A1 | 9/2006 | Sarma et al. |
| 2007/0038887 | A1* | 2/2007 | Witte et al. .................... 714/6 |
| 2007/0055703 | A1* | 3/2007 | Zimran et al. ............... 707/200 |
| 2007/0088702 | A1 | 4/2007 | Fridella et al. |
| 2007/0168692 | A1* | 7/2007 | Quintiliano .................... 714/4 |
| 2007/0203877 | A1* | 8/2007 | Qu et al. ........................ 707/1 |
| 2009/0006792 | A1 | 1/2009 | Federwisch et al. |
| 2009/0030983 | A1 | 1/2009 | Malaiyandi et al. |

OTHER PUBLICATIONS

Gray, Jim, et al., The Recovery Manager of the System R Database Manager, ACM Computing Surveys, (13)2:223-242 1981, 20 pages.

Hecht, Matthew S., et al. Shadowed Management of Free Disk Pages with a Linked List, ACM Transactions on Database Systems, 8/4, Dec. 1983, pp. 503-514.

Kent, Jack et al., Optimizing Shadow Recovery Algorithms, IEEE Transactions on Software Engineering, 14(2): 155-168, Feb. 1988.

Lin et al. "System and Method for Transparent Data Replication over Migrating Virtual Servers", filed Apr. 24, 2007 as U.S. Appl. No. 11/739,239, 30 pages.

* cited by examiner

SYSTEM AND METHOD FOR DATA PROTECTION MANAGEMENT IN A LOGICAL NAMESPACE OF A STORAGE SYSTEM ENVIRONMENT

CROSS-REFERENCE TO RELATED APPLICATION

The present invention is related to the following commonly assigned U.S. patent application Ser. No. 11/384,711 titled, System and Method for Integrating Namespace Management and Storage Management in a Storage System Environment, filed herewith, which application is hereby incorporated by reference.

FIELD OF THE INVENTION

The present invention relates to storage systems, and more specifically, to data protection in a logical namespace of a storage system environment.

BACKGROUND OF THE INVENTION

A storage system typically comprises one or more storage devices into which information may be entered, and from which information may be obtained, as desired. The storage system includes an operating system that functionally organizes the system by, inter alia, invoking storage operations in support of a storage service implemented by the system. The storage system generally provides its storage services through the execution of software modules, such as processes. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access information stored on the system. In this model, the storage system may be embodied as file server executing an operating system, such as the Microsoft® Windows™ operating system (hereinafter "Windows operating system"). Furthermore, the client may comprise an application executing on an operating system of a computer that "connects" to the server over a computer network, such as a point-to-point link, shared local area network, wide area network, or virtual private network implemented over a public network, such as the Internet. Each client may request the services of the server by issuing storage access protocol messages (in the form of packets) to the server over the network. By supporting a plurality of storage (e.g., file-based) access protocols, such as the conventional Common Internet File System (CIFS) and the Network File System (NFS) protocols, the utility of the server is enhanced.

To facilitate client access to the information stored on the server, the Windows is operating system typically exports units of storage, e.g., (CIFS) shares. As used herein, a share is equivalent to a mount point or shared storage resource, such as a folder or directory that stores information about files or other directories served by the file server. A Windows client may access information in the directory by mounting the share and issuing a CIFS protocol access request that specifies a uniform naming convention (UNC) path to the share. The UNC path or pathname is an aspect of a Windows networking environment that defines a way for a client to refer to a unit of storage on a server. The UNC pathname is prefixed with the string \\ to indicate resource names on a network. For example, a UNC pathname may comprise a server name, a share (directory) name and a path descriptor that collectively reference a unit of storage or share. Thus, in order to access the share, the client typically requires knowledge of the specific physical location (i.e., the identity) of the server exporting the share.

Instead of requiring the client to provide the specific identity of the file server exporting the share, it is desirable to only require a logical pathname to the share. That is, it is desirable to provide the client with a globally unique pathname to the share without reference to the file server. The conventional Distributed File System (DFS) namespace service provides such a solution in a Windows environment through the creation of a namespace that removes the specificity of server identity. DFS is well-known and described in *DCE 1.2.2 DFS Administration Guide and Reference*, 1997, which is hereby incorporated by reference. As used herein, a namespace is a view of shared storage resources (such as shares) from the perspective of a client. The DFS namespace service is generally implemented using one or more DFS servers and distributed components in a network.

Using the DFS service, it is possible to create a unique pathname (in the form of a UNC pathname) for a storage resource that a DFS server translates to an actual location of the resource (share) in the network. However, in addition to the DFS namespace provided by the Windows operating system, there are many other namespace services provided by various operating system platforms, including the NFS namespace provided by the conventional Unix® operating system. Each service constructs a namespace to facilitate management of information using a layer of indirection between a file server and client accessing a shared storage resource (share) on the server. For example, a share may be connected or "linked" to a link point (link in DFS terminology or a mount point in NFS terminology) to hide the machine specific reference to the share. By referencing the link point, the client can automatically access information on the storage resource of the specific machine. This allows an administrator (user) to store the information on any server in the network by merely providing a reference to the information (or share). However, these namespaces are typically services created on heterogeneous server platforms, which leads to incompatibility and non-interoperability with respect to management of the namespaces by the user. For example, the DFS namespace service is generally limited to Windows-based operating system platforms, whereas the NFS namespace service is generally limited to Unix-based operating system platforms.

The Virtual File Manager (VFM™) developed by NuView, Inc. and available from Network Appliance, Inc., ("NetApp") provides a namespace service that supports various protocols operating on various file server platforms, such as NetApp filers and DFS servers. The VFM namespace service is well-known and described in *VFW™ (Virtual File Manager) Reference Guide, Version 4.0, 2001-2003*, and *VFM™ (Virtual File Manager) Getting Started Guide, Version 4.0, 2001-2003*.

A difficult and time-consuming issue involved with managing a server, such as a file server or filer, is copying data, e.g., a data set, from an original server ("primary server") to another server ("backup server") to protect against data loss/corruption due to primary server failure. As used herein, a data set is defined as one or more storage units, such as volumes and/or "qtrees" that when combined represent data being protected against disaster. A qtree is a special directory that has the properties of a logical sub-volume within a physical volume.

One way to copy or duplicate a data set onto a backup server to ensure against total primary server failure is to replicate a primary server data set at the backup server using conventional data replication facilities, such as remote asynchronous mirroring. In this sense, the duplicated data set could include all or part of a file system. An example of an asynchronous data replication facility is the SnapMirror facility available from Network Appliance, Inc. Examples of techniques for duplicating all or part of a file system that may be advantageously used with the invention are described in U.S. patent application Ser. Nos. 09/127,497 titled File System Image Transfer, by Kleiman et al, filed Jul. 31, 1998 and issued on Aug. 5, 2003 as U.S. Pat. Nos. 6,604,118 and 09/426,409 titled File System Image Transfer Between Dissimilar File Systems, by Kleiman et al., filed Oct. 25, 1999 and issued on Jun. 3, 2003 as U.S. Pat. No. 6,574,591, which applications are hereby incorporated by reference as though fully set forth herein.

Broadly stated, the SnapMirror facility periodically replicates a data set stored on a primary server ("source filer") to a backup server ("destination filer") at a user-definable time interval, with the range being from one minute to one month. At the end of each data replication event, the backup data set becomes an exact block-for-block "mirror" copy of the primary data set. At that point, the two data sets share identical data content and characteristics. The mirror is initialized by effectively copying the entire primary data set to the backup data set. Once this initial copy is complete, replication events thereafter copy only changed blocks from the primary data set to the backup data set to thereby provide an efficient data replication mechanism.

It is also possible to protect a unit of storage, such as share, on a primary data set that is exported by a namespace (which is used to access the share) using the data replication facility. Often, there is more than one location (link) within the namespace where the share may reside. Once the share is protected and in response to a source filer failure, another mechanism is needed to specify actions to be taken to failover the link to the backup data set on the destination filer. Such a mechanism may include a management application that detects a failure on the source filer and invokes the mirror on the destination filer.

Previous namespace services (such as the VFM namespace service) have the capability to monitor a source share on a source volume and/or qtree of a source filer and, upon a failure, insert a destination share on the mirror of the destination filer into a namespace. However, such services monitor failures at the filer level. A noted disadvantage of this approach is that if the original volume is taken offline or otherwise fails on the source filer, the services do not detect that a failure to the source share has occurred and the management application cannot invoke the mirror to access the destination share. Accordingly, applications requiring access to the destination share fail. In addition, it is possible for the source filer (and source volume) to be operational, but the source share to be inaccessible. For example, the source share may be deleted or its properties changed so that it is no longer accessible. Since the previous services cannot detect such a source share failure, the insertion of the destination share into the namespace does not occur.

SUMMARY OF THE INVENTION

The disadvantages of the prior art are overcome by providing a system and method for data protection in a logical namespace of a storage system environment. An integrated management framework implements a data protection technique that monitors failures in the logical namespace at a managed data object granularity, e.g., a share. In the event of a failure to the data object, e.g., a primary share, the data protection technique enables automatic failover for a link point to the object (primary share) that is protected by a backup copy of the data object, e.g., a secondary share. That is, the data protection technique enables failover from the primary share to a secondary share and corresponding linking of the secondary share to the link point in the logical namespace.

According to the technique, an administrator (user) creates a data protection policy that specifies failover characteristics when the managed data object (i.e., the primary share) is inaccessible. A namespace and storage management (NSM) server of the integrated management framework cooperates with a NSM console and a remote agent to monitor the primary share (e.g., a source share on a source volume of a data replication event) for failure. Upon detecting such a failure, the integrated management framework creates a secondary, backup copy of the share (e.g., a destination share on a destination volume of the replication event). The NSM server then automatically switches a namespace reference in the logical namespace from the source share to the destination share to thereby make the destination share available through the namespace.

Advantageously, the present invention monitors failure at a managed data object level (e.g., at the share level) as opposed to a host machine level (e.g., at the filer level), to thereby provide enhanced (robust) data/failure protection. That is, if the source volume of a source filer fails, the integrated management framework detects the failure of the source share on the source volume and invokes a namespace switch operation to replace a namespace link point to the source share with a link point to the destination share on the destination volume. Moreover, the invention provides a data protection policy that, once created, can be applied to one or more data protected link points to specify the failover action to be taken on each link point. The data protection policy also provides a reusable way to specify failover characteristics of multiple data protected link points (at multiple locations) simultaneously.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
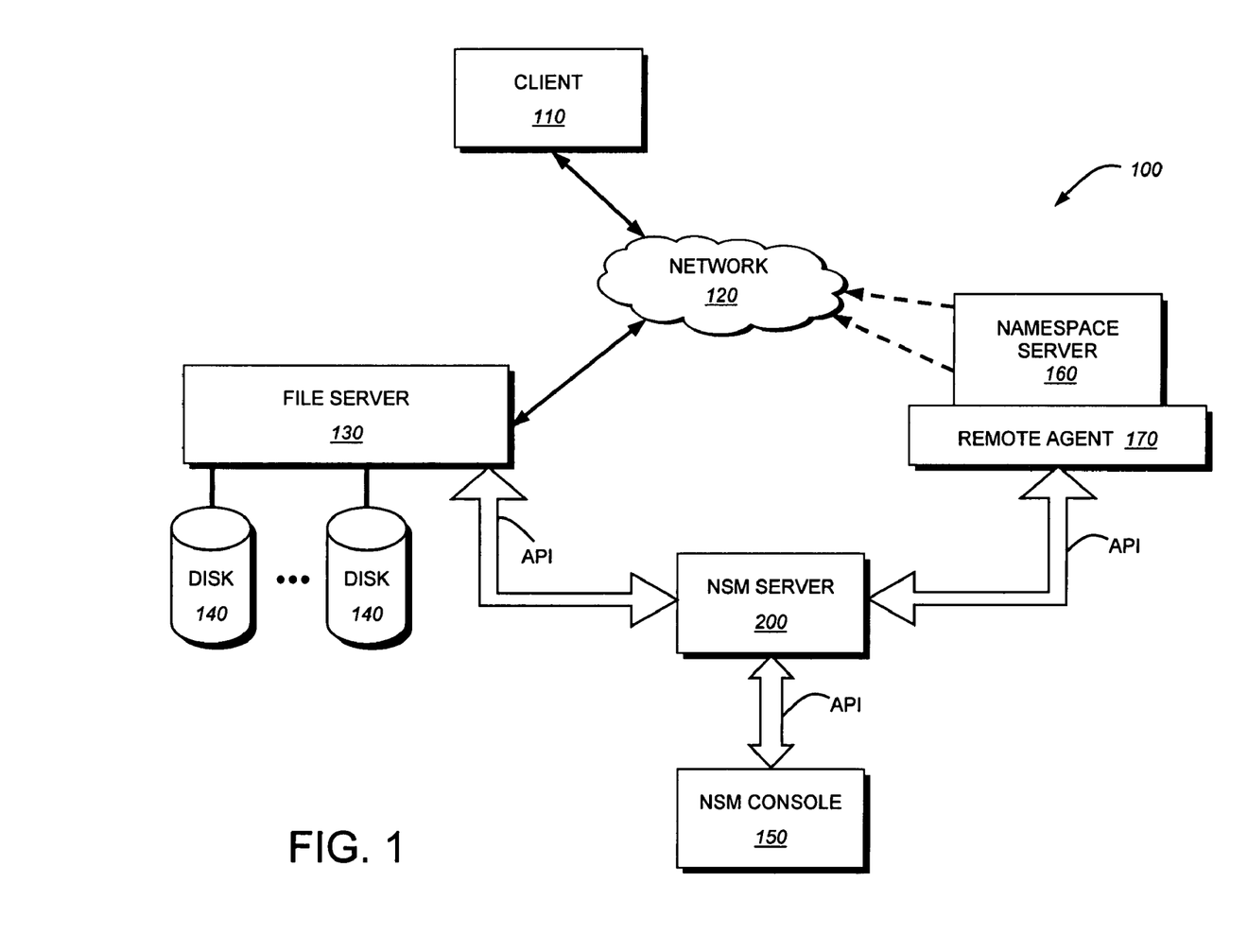
FIG. 1 is a schematic block diagram of an exemplary storage system environment that may be advantageously used with the present invention.

FIG. 1 is a schematic block diagram of an exemplary storage system environment 100 that may be advantageously used with the present invention. The storage system environment comprises a plurality of storage systems configured to provide storage services relating to information stored on storage devices, such as disks 140. The storage systems include file servers 130 executing operating systems such as, e.g., the Microsoft® Windows™ operating system (hereinafter "Windows operating system"), the Unix® operating system and the NetApp® Data ONTAP®operating system available from Network Appliance, Inc., Sunnyvale, Calif. One or more clients 110 may connect to the file servers over a computer network 120, such as a point-to-point link, shared local area network, wide area network, or virtual private network implemented over a public network, such as the Internet.

Each client 110 may comprise an application executing on an operating system of a general-purpose computer that interacts with the file servers 130 in accordance with a client/server model of information delivery. That is, the client may request the services of a server, and the server may return the results of the services requested by the client, by exchanging packets over the network 120. The client may issue packets including storage (e.g., file-based) access protocols, such as the Common Internet File System (CIFS) protocol or Network File System (NFS) protocol, over the Transmission Control Protocol/Internet Protocol (TCP/IP) when accessing information in the form of, e.g., files and directories.

To facilitate client access to the information stored on the server, a file server 130 executing, e.g., the Windows operating system typically exports units of storage, e.g., (CIFS) shares. A client 110 may access information of the share by mounting the share and issuing a CIFS protocol access request that specifies a uniform naming convention (UNC) path to the share. Although the illustrative embodiment is directed to a Windows file server that is accessed using the CIFS protocol, the invention described herein is not so limited and may also apply to other servers 130, such as Unix file servers and NetApp filers, that are accessible using other file access protocols, such as the NFS protocol. The client connects to file server 130 when accessing the share, typically by specifying the IP address (or identity) of the file server.

However, instead of requiring that the client know the specific identity of the server in order to access the share, a namespace server 160, such as the conventional Distributed File System (DFS) server, provides a namespace service that removes the specificity of server identity. Using the DFS service, a unique pathname (in the form of a UNC pathname) is created for the share that the DFS server translates to an actual location of the share in the network. Moreover, in a typical Windows environment wherein a group of machines is organized as a domain, a domain controller, such as a primary domain controller (PDC), provides security (e.g., rights, privileges and authentication) services for the machines. Note that the PDC and DFS server may reside on separate machines or, as in the illustrative embodiment described herein, may reside on the same machine as separate services.

For example, assume a client application issues a CIFS request to access information of a share stored on a file server 130 in the environment 100. The request is passed through various layers of the client's operating system including, e.g., a CIFS redirector. Before issuing a CIFS packet directed to a UNC pathname specified by the client application, the redirector contacts a DFS server to determine whether there is a different, actual pathname needed to access the information. At that time, the DFS server performs a PDC lookup operation to determine whether the client has the appropriate privileges to access the data. If so, the actual pathname is provided to the redirector, which then uses that pathname to create the CIFS packet for transmission over the network to the appropriate file server. The DFS namespace service thus provides a level of indirection to a share that resides on a file server 130 in the environment 100. Upon receiving the packet, the file server verifies that the client has the appropriate privileges to access the information.

Although the illustrative embodiment is directed to a DFS namespace service provided by the Windows operating system executing on a DFS server, the invention described herein is not limited and may also apply to other namespace services, such as the NFS namespace provided by the Unix operating system executing on a conventional Name Information Service (NIS) server. Each service constructs a namespace to facilitate management of information using a layer of indirection between a file server 130 and client 110 accessing a shared storage resource (share) on the server. However, these namespace services are created on heterogeneous server platforms, which lead to incompatibility and non-interoperability with respect to management of different namespaces by, e.g., an administrator (user).

In the illustrative embodiment, a namespace and storage management (NSM) server 200 is provided that integrates namespace management and storage management in storage system environment 100. The NSM server 200 includes an integrated management framework that provides an underlying infrastructure that supports various heterogeneous storage access protocols within a single, logical namespace service. To that end, the NSM server cooperates with a NSM console 150 and a remote agent 170 to create the integrated management framework. The integrated management framework, in turn, allows the NSM server 200 to interact with any namespace server, such as a DFS server configured to handle CIFS protocol requests or a NIS server configured to handle NFS protocol requests, directed to namespace services.

Figure 2:
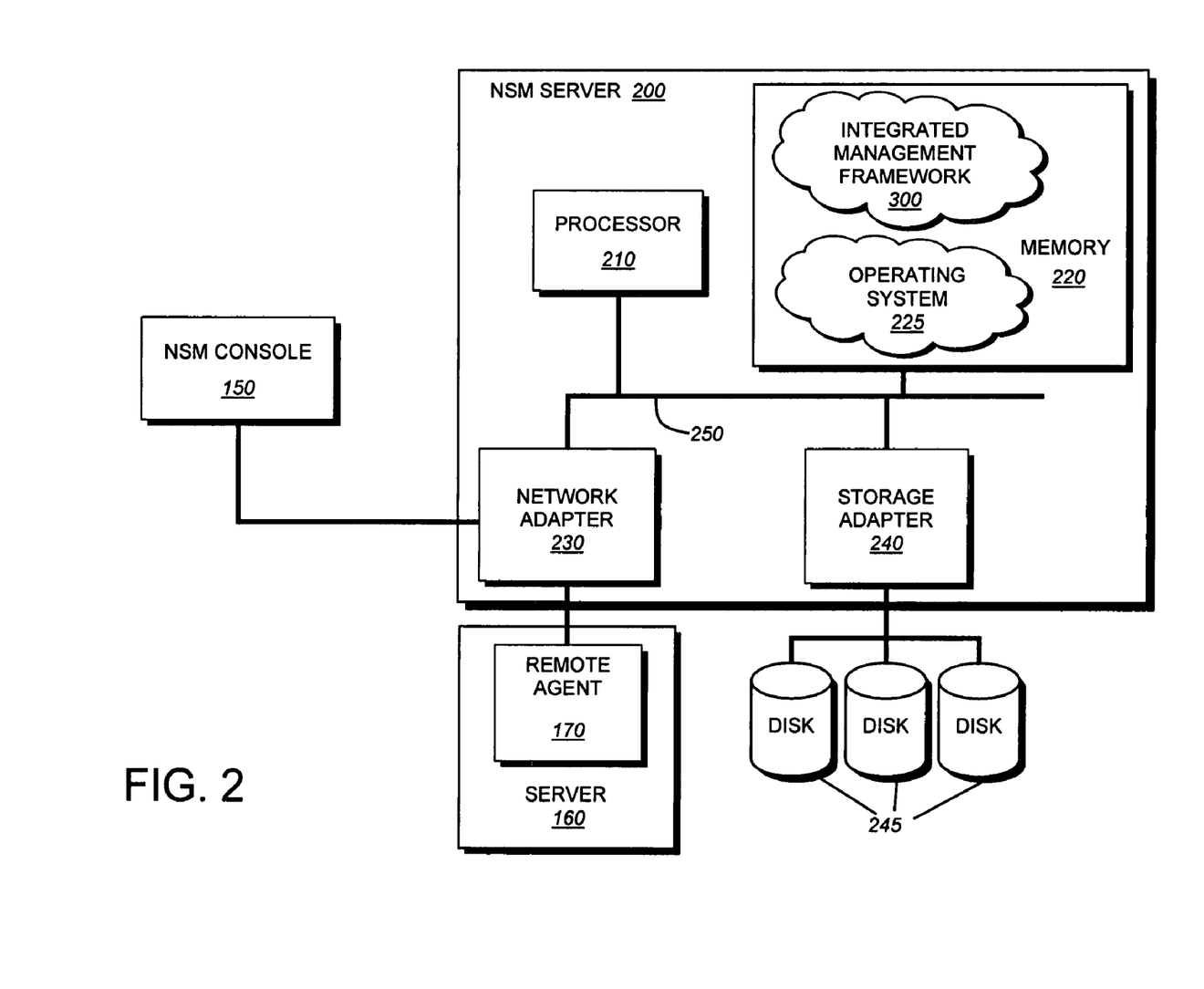
FIG. 2 is a schematic block diagram of an exemplary namespace and storage management server that may be advantageously used with the present invention.

FIG. 2 is a schematic block diagram of an exemplary namespace and storage management (NSM) server 200 that may be advantageously used with the present invention. The NSM server illustratively comprises a processor 210, a memory 220, a network adapter 230 and a storage adapter 240 interconnected by a system bus 250. The memory 220 may comprise storage locations addressable by the processor and adapters for storing software programs, i.e., specific sets of ordered operations, and data structures associated with the invention. The processor and adapters may, in turn, comprise processing elements and/or logic circuitry configured to execute the programs and manipulate the data structures. In particular, the storage adapter 240 comprises the mechanical, electrical and signaling circuitry needed to connect the server to storage devices, such as disks 245. Similarly, the network adapter 230 comprises the mechanical, electrical and signaling circuitry needed to connect the server 200 to, e.g., the NSM console 150 and remote agent 170.

An operating system 225, portions of which is typically resident in memory 220 and executed by the processing elements, functionally organizes the server by, inter alia, invoking operations in support of storage services implemented by the server. In the illustrative embodiment, the operating system is preferably the Windows operating system, although it is expressly contemplated that any appropriate operating system, such as the Unix operating system, may be enhanced for use in accordance with the inventive principles described herein. The operations invoked by the operating system are illustratively namespace and storage operations in support of an integrated management framework 300 provided by the server. It will be apparent to those skilled in the art that other processor and memory means, including various computer readable media, may be used for storing and executing program instructions pertaining to the invention described herein.

B. Integrated Management Framework

Figure 3:
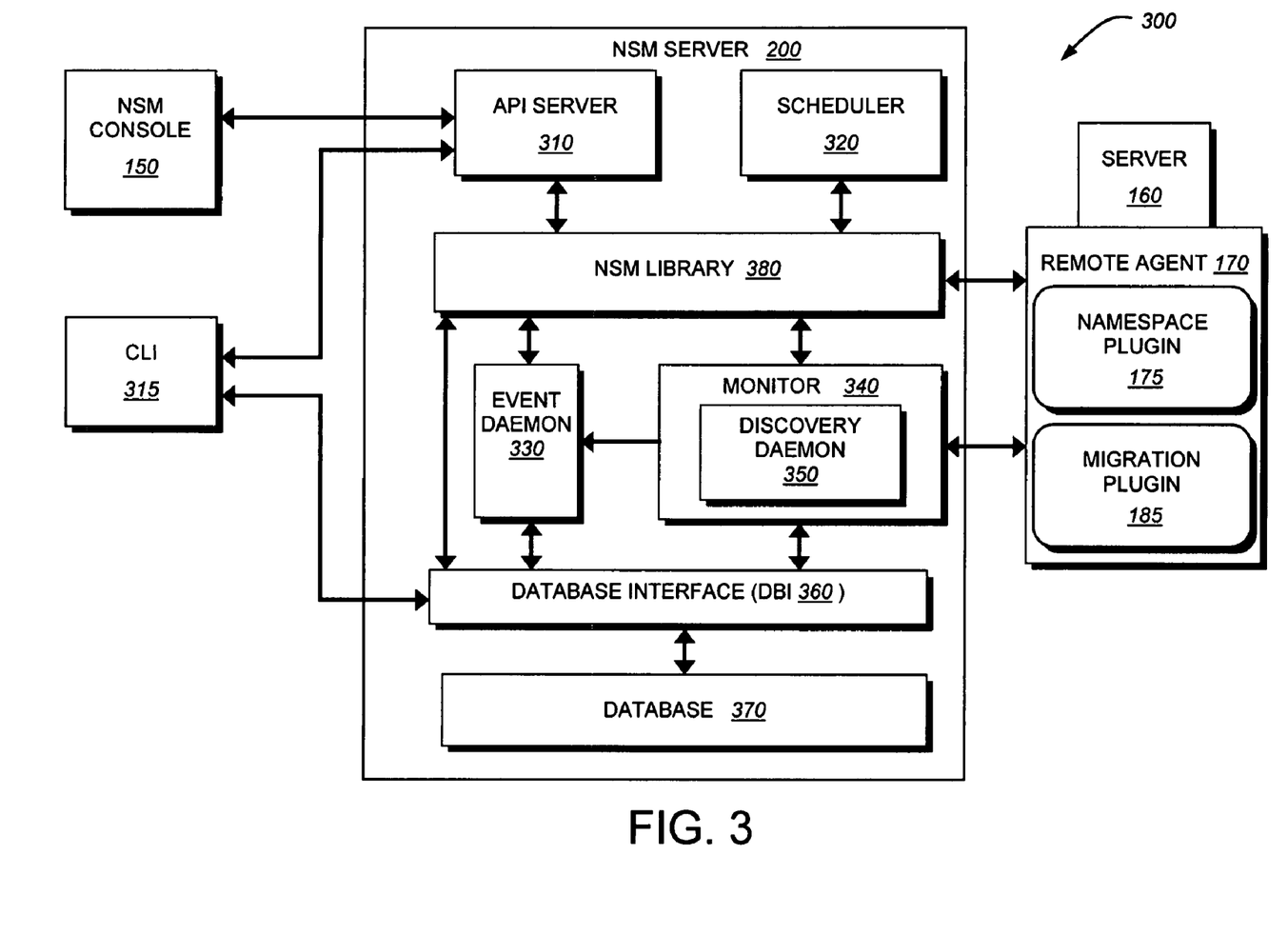
FIG. 3 is a schematic block diagram of an integrated management framework in accordance with the present invention.

The NSM server 200 generally provides its storage services through the execution of software modules, such as processes. These services are illustratively implemented as separately-scheduled processes (and/or daemons) that execute in user space of operating system 225 to provide the integrated management framework 300. As used herein, a process refers to an instance of a program being executed by, e.g., the processor and a thread is an instance of a sequence of the process's program code. FIG. 3 is a schematic block diagram of the integrated management framework 300 in accordance with the present invention. The integrated management framework 300 provides a logical namespace service that is based on extensions to underlying storage management technology and other technological components. Notably, these extensions are embodied as library functionality.

In the illustrative embodiment, the underlying storage management technology is embodied as DataFabric® Manager (DFM) technology available from Network Appliance, Inc., Sunnyvale, Calif. and described in *DataFabric® Manager 3.2 Administration Guide,* 1994-2004, which is hereby incorporated by reference. Broadly stated, the DFM technology comprises a set of coordinating processes, including an application programming interface (API) server 310, a scheduler 320, an Event daemon 330, a Monitor 340 including a Discovery daemon 350 and a database interface (DBI) 360 configured to interact with an embedded database 370. The present invention extends the capabilities of these processes to create the integrated namespace and storage management framework 300 through the addition of NSM library functionality 380. As described herein, the NSM library 380 is illustratively implemented as various library modules, each of which provides namespace and storage management actions embodied as APIs.

The integrated management framework 300 exposes a set of interfaces, e.g., an API interface that is used by the NSM console 150 and a command line interface (CLI 315), used by a communication protocol. Illustratively, the communication protocol is embodied as an XML over HTTP mechanism for APIs, primarily because of its ability to describe data conveyed over the network, as well as the transport, without describing the actual storage access protocol. An example of a communication protocol that may be advantageously used with the present invention is the ZAPI protocol available from Network Appliance, Inc. Such a protocol is also easily extensible and flexibly agnostic to binary formats of specific servers and clients to thereby operate efficiently in a heterogeneous environment.

In the illustrative embodiment, the integrated management framework 300 facilitates configuration and management of pathnames in the logical namespace. That is, the underlying infrastructure of the framework allows a user to manage various pathnames exported by heterogeneous namespace service and protocol implementations within the logical namespace. This aspect of the framework involves creation of a layer of abstraction that presents to a client a notion of the logical namespace that is accessible via a particular storage access protocol. As noted, the various heterogeneous namespace services are not interoperable with respect to user management; the integrated framework 300, as described further herein, extracts logical "views" (e.g., pathnames) from the namespaces exported by the heterogeneous services, stores those pathnames in database 370, and then configures the pathnames so that they are accessible in the logical namespace via the storage access protocol.

In storage and networking environments, some operations can only be executed if a user (such as a system administrator) is logged into a server on which the operations are to be performed, e.g., the NSM server. In other words, a remote operation that is to be invoked on the server 200 can only be performed if the user is logged into the server. The NSM console 150 and remote agent 170 of the integrated management framework 300 address this problem. Illustratively, the NSM console 150 is a component of the framework that includes a JAVA-based interface and the remote agent 170 is a software module installed on a host machine, such as a server 160. Using the communication protocol, the NSM console issues APIs to the NSM server which, in turn, issues APIs that are invoked on the remote agent to perform actions requested by the user.

Essentially, the remote agent 170 is a thin web server that includes "programmatic glue" to enable installation of plug-in modules ("plug-ins") that provide certain functionality of the remote agent. Notably, the remote agent and plug-in module are "preinstalled" on the host machine (i.e., installed during configuration of the machine by, e.g., an administrator) in a manner that is non-obtrusive to operation of the host machine. In the illustrative embodiment, plug-in modules include a namespace plug-in 175 that allows remote access and management of data (e.g., pathnames) by the NSM server 200 and a migration plug-in 185 that provides a migration capability of the remote agent 170.

The remote agent and plug-ins are illustratively constructed without the use of operating system specific code, and are integrally adapted to operate on various operating system platforms through the use of operating system calls and APIs specific to each platform. For example, a remote agent and plug-in that reside on a Windows host machine use Windows operating systems calls and APIs (e.g., Win32 APIs) to communicate with the host machine. To that end, the remote agent 170 may further comprise an API server that cooperates with an API service on Windows platforms (or a daemon process on Unix platforms) to receive API requests from the NSM server and translate them into host machine calls, such as Win32 APIs or Unix system calls.

It should be noted that the underlying directory data structures used in the logical namespace described herein reside on the namespace server 160 providing the particular namespace service, such as a DFS server. That is, the namespace server 160 implements the basic namespace; the NSM server 200 provides a service for configuring that namespace. To that end, the NSM server 200 cooperates with the remote agent 170 to acquire a copy of the namespace directory structures from the namespace server 160 and stores the copy on the embedded database 370. The NSM server then cooperates with the NSM console 150 to allow a user to manipulate (configure) the copy. Once configuration is complete, the server 200 cooperates with the remote agent to "push" (store) the manipulated copy of directory structures back to the namespace server 160.

The Monitor 340 is illustratively embodied as a multi-threaded process having a collection of individual monitor threads, each of which is scheduled by the scheduler 320. The Monitor 340 cooperates with the remote agent 170 to communicate with one or more machines/devices in the storage system environment 100 (using SNMP, RSH, etc) to collect any type of storage or data/namespace object information (e.g., volume and/or qtree information, as well as information about namespace servers) available in the environment and, to that end, functions as a data collector. Illustratively, each monitor thread is configured to collect information about a particular object in the environment. Extensions to the Monitor are directed to namespace and agent management, each of which is illustratively embodied as an individual monitor thread.

As data is collected, the Monitor 340 determines whether it needs to notify any processes of some resulting condition. For example, an individual monitor thread may detect a threshold and the occurrence of some type of event. As used herein, an event is a synchronous notification with a severity attribute. By configuring thresholds, the NSM server 200 can determine when an event occurs. An example of a threshold is "if volume capacity is greater than 50%, generate an event, out-of-space". If a threshold is exceeded, the Monitor 340 communicates with the Event daemon 330 to notify it of that event. Thus, the Monitor 340 is configured to detect certain events and, in response, generate event notifications to the Event daemon 330. The Event daemon 330 then determines what (if any) further action is needed (e.g., send an SMTP alert, an email, an SNMP trap) and records the event in the embedded database 370.

The embedded database 370 is illustratively implemented as a Sybase relational database that exports a set of Simple Query Language (SQL) function calls that enable storage/retrieval of data, such as namespace objects, to/from the database. A schema of the database is configured to efficiently capture characteristics of a namespace independent of the storage access protocol, such as NFS or CIFS. The database 370 is illustratively organized as a plurality of tables, each of which can be accessed by processes within the NSM server. The DBI 360 is illustratively embodied as a SQL interface to the database and its associated tables, although it will be understood to those skilled in the art that the DBI may be embodied as any other type of database protocol interface depending on the actual implementation of the database, e.g., an Oracle database.

The API server 310 is illustratively embodied as a multi-threaded process that is configured to implement the APIs used by the NSM console 150 to access the database 370 and manipulate information stored thereon. The API server 310 also implements the communication protocol APIs used to interact with the remote agent 170. Accordingly, extensions to the API server 310 are primarily directed to those APIs required to manipulate the database and the remote agent. For example, APIs are invoked by a user (via the NSM console 150) to manipulate (modify, update) the embedded database 370. The API server 310 updates the database with respect to user configuration requests and the Monitor 340 periodically queries (polls) the database for any state/information change. Depending upon the change, the API server may cooperate with the Monitor to instruct data collection from the remote agent 170. After receiving the collected information from the remote agent, the Monitor 340 updates the database and the Event daemon 330.

C. Data Protection

The present invention is directed to a system and method for data protection in a logical namespace of a storage system environment. The integrated management framework implements a data protection technique that monitors failures in the logical namespace at a managed data object granularity, e.g., a share. In the event of a failure to the data object, e.g., a primary share, the data protection technique enables automatic failover for a link point to the object (primary share) that is protected, i.e., data protected (DP), by a backup copy of the data object, e.g., a secondary share. That is, the data protection technique enables failover from the primary share to a secondary share and corresponding linking of the secondary share to the link point in the logical namespace.

In the illustrative embodiment, the data protection technique operates in connection with a conventional data replication facility, such as a remote asynchronous mirroring facility, to copy or duplicate a data set from a primary machine, such as a server or filer ("source filer") to a backup machine ("destination filer") to protect against data loss/corruption due to source filer failure. As used herein, a data set is defined as one or more storage units, such as volumes and/or qtrees, that when combined represent data being protected against disaster. An example of an asynchronous data replication facility is the SnapMirror facility available from Network Appliance, Inc.

Broadly stated, the SnapMirror facility periodically replicates a data set, e.g., a source volume, stored on the source filer to the destination filer at a user-definable time interval, with the range being from one minute to one month. At the end of each replication event, the destination volume becomes an exact block-for-block "mirror" copy of the source volume. At that point, the two volumes share identical data content and characteristics. The mirror is initialized by effectively copying the entire source volume to the destination volume. Once this initial copy is complete, replication events thereafter copy only changed blocks from the source volume to the destination volume to thereby provide an efficient data replication mechanism.

Figure 4:
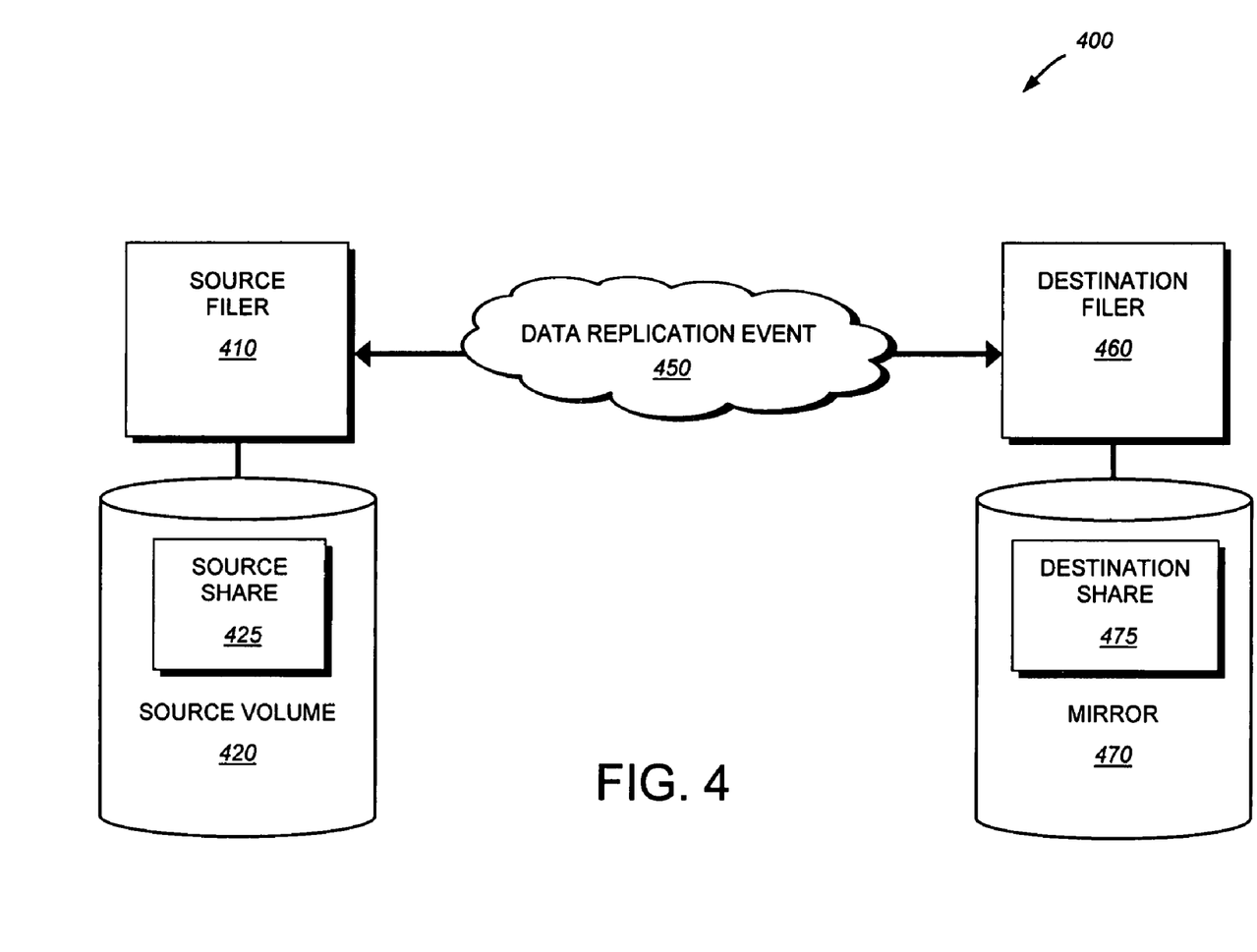
FIG. 4 is a schematic block diagram illustrating the use of data replication in an exemplary storage system environment.

FIG. 4 is a schematic block diagram illustrating the use of data replication in an exemplary storage system environment 400. A source filer 410 hosts a source share 425, such as a CIFS share, within a source volume 420, wherein the source share is a target of a link point, such as a DFS link. Assume that the source filer 410 is the source of a data replication event 450 using, e.g., a conventional data replication facility, and a destination filer 460 is the destination of a destination volume (i.e., an identical copy or "mirror 470" of the source volume) generated by the event 450. Assume further data protection (DP) is set on the source share 425 and the share subsequently becomes unavailable. In response, an identical destination (CIFS) share 475 is created automatically by the integrated management framework 300 on the destination mirror 470. As described herein, the identically created destination share 475 then becomes the target of the link point.

According to the technique, an administrator (user) creates a data protection policy that specifies failover characteristics when the managed data object (e.g., a source share) is inaccessible. Note that a data protection job is an executable entity of the data protection policy that is created in accordance with a policy architecture of the integrated management framework 300. An example of a policy architecture that may be advantageously used with the present invention is disclosed in previously incorporated U.S. patent application Ser. No. 11/384,711 titled, System and Method for Integrating Namespace Management and Storage Management in a Storage System Environment.

Specifically, the policy architecture can be employed to create a data protection policy that enables one or more link points for data protection. The user interacts with the NSM console 150 to associate the data protected link points with the policy and the console interacts with the NSM server 200 to persistently save the policy in the embedded database 170. The data protection policy enables the integrated management framework 300 to monitor a particular data object at any managed data object level, e.g., a qtree, a volume, etc. In the illustrative embodiment, however, the managed data object level is preferably a (CIFS) share because that level is a target of a DFS link.

The data protection policy is illustratively created using a policy-creation wizard of the NSM console 150 that allows a user to specify a number of parameters for data protection. For example, once the user enables data protection (DP) for one or more link points to one or more (primary target) source shares, the data protection policy may specify failover characteristics in the event the source share (link point) is inaccessible. Table 1 lists some user-selectable parameters of the data protection policy:

TABLE 1

| Name | Type | Description |
| --- | --- | --- |
| automatic-failover | boolean optional | If TRUE, link points associated with this policy fail over automatically. |
| break-on-failover | boolean optional | If TRUE break mirror on failover. |
| retry-count | integer optional | Do not failover until link point fails retry-count times. This parameter will fail over the link point only after it fails the stated number of times. If the user has not entered any value for the retry count the default value is taken as zero and the link point will failover the first time the primary target is inaccessible. |
| userdefined-script | string optional | Path of a user defined script. NSM server calls this script before and after performing a failover. |

The first parameter (e.g., automatic-failover) specifies whether automatic failover of each link point to a source share is enabled by the NSM server upon detecting a failure in the source share, i.e., is the link point data protected. If so, each source share link is point associated with the policy automatically fails over to a destination share link point. If the automatic failover parameter is not enabled, the user manually failovers each source share link point. The second parameter (break-on-failover) specifies whether the mirroring relationship between the source and destination (backup copy) volumes/shares should be broken once a failover occurs. The third parameter (retry-count) specifies the number of times the link point is probed before rendering the underlying data of the share inaccessible. The last parameter (userdefined-script) is a user specified script that runs on the NSM server 200 before and after performing a failover.

Upon specifying these parameters, the user may persistently save the parameters as a policy under a policy name. To associate a policy with a link point, the following parameters shown in Table 2 may be specified by the user:

TABLE 2

| Name | Type | Description |
| --- | --- | --- |
| path-name | string | The path name or id of the link point. |
| policy-name | string | The policy name or id of the data protection policy to be used. |
| secondary-share-name | string | Name of the secondary share. |
| mirror-id | integer | Handle of mirror created by data replication facility. |

Figure 5A:
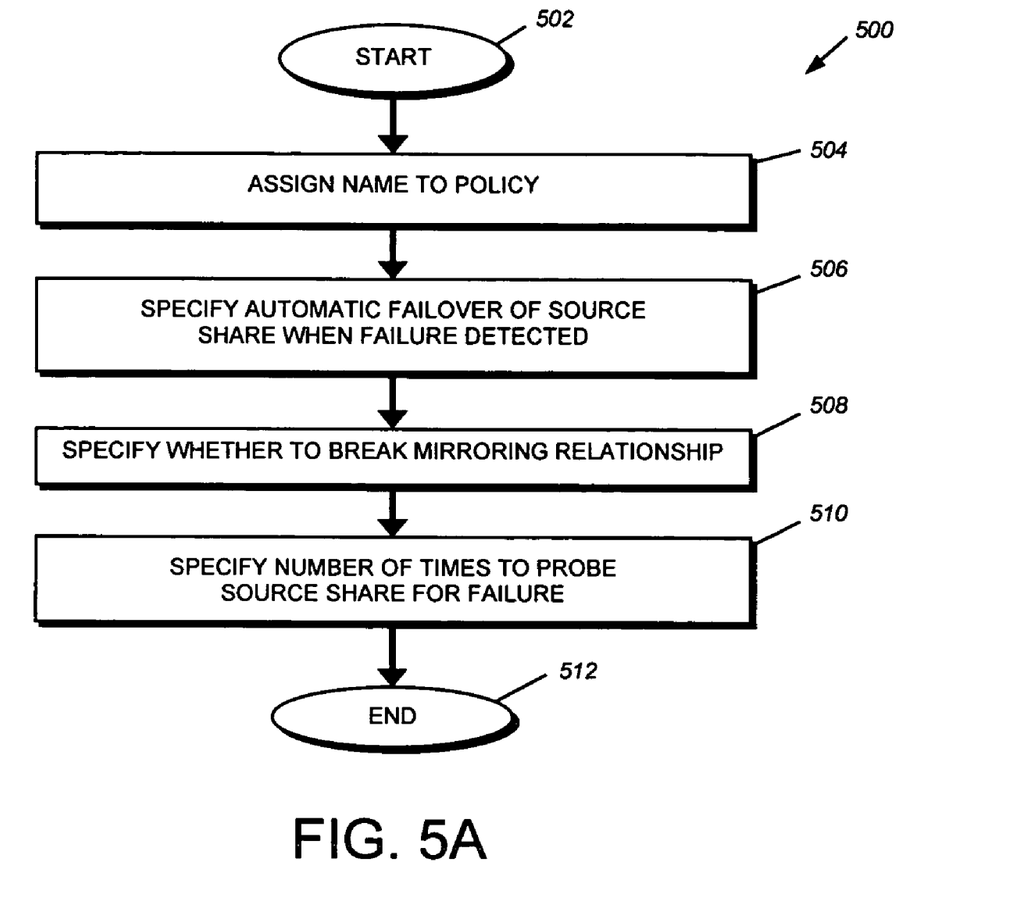
FIG. 5A is a flowchart illustrating a procedure for creating a data protection policy in accordance with an embodiment of the present invention.

The first parameter (path-name) is the name or identifier (ID) of the link point for the source share and the second parameter (policy-name) is the name or ID of the policy. The third parameter (destination-share-name) is the name of the (secondary) target share that is used as a (CIFS) mount point on the destination share. The last parameter (mirror-ID) is a handle of the mirror used to monitor the status of the mirroring relationship between the source and destination volumes/shares.

is Assume a source share resides on a source volume of a source filer and a user employs a data replication facility, such as the SnapMirror facility, to create a mirror on a destination volume of a destination filer. Assume further that a link point for the source share is inserted (exists) within the logical namespace. FIG. 5A is a flowchart illustrating a procedure for creating a data protection policy in accordance with an embodiment of the present invention. The procedure 500 starts at Step 502 and proceeds to Step 504 where the user interacts with the NSM console to assign a name to the policy. In Step 506, the user interacts with the console to specify that failover should be performed automatically when a failure is detected with the source share and, in Step 508, to specify whether the mirroring relationship between the source and destination volumes should be broken in response to the failover. In Step 510, the user interacts with the NSM console to specify the number of times the source share (link point) is probed before rendering the share (and its underlying data) inaccessible/failed. The procedure then ends at Step 512.

Figure 5B:
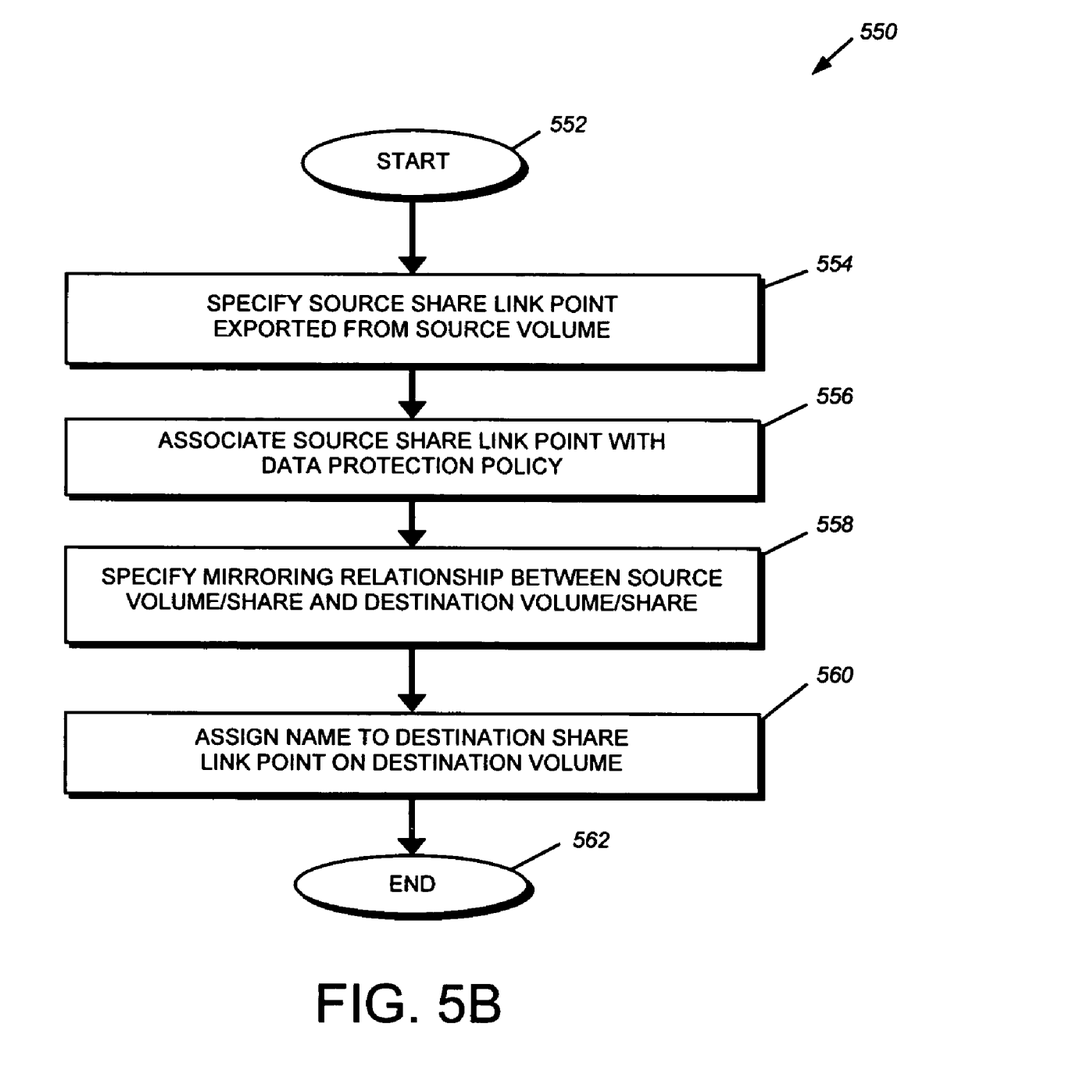
FIG. 5B is a flowchart illustrating a procedure for applying a data protection policy on a link point in accordance with an embodiment of the present invention.

FIG. 5B is a flowchart illustrating a procedure for applying a data protection policy on a link point in accordance with an embodiment of the present invention. The procedure 550 starts at Step 552 and proceeds to Step 554 where a user interacts with the NSM console to specify that the link point has a share (e.g., source share) exported from a volume (e.g., source volume) that is mirrored to a secondary volume (e.g., destination volume). In Step 556, the user interacts with the console to associate that link point (i.e, source link point) with the data protection policy and, in Step 558, to specify the handle of the mirror used to monitor the status of the mirroring relationship between the source and destination volumes/shares. In Step 560, the user interacts with NSM console to assign a name to the destination share on the destination volume mirror. Thereafter, the destination share is created and its link point inserted into the logical namespace to essentially replace the source share link point during failover in response to failure of the source share. The procedure then ends at Step 562.

According to the data protection technique, the NSM server 200 of the integrated management framework cooperates with the NSM console 150 and a remote agent 170 to monitor a primary share (e.g., a source share on a source volume of a data replication event) for failure. In addition, these components of the framework may monitor a secondary, backup copy of the share (i.e., a destination share on a destination volume of the replication event), if it exists, to ensure that it is accessible. Such monitoring may occur via, e.g., a heartbeat signal utilized among the components. If the destination share is not accessible, the user is informed through an event, e.g., an event message, that the source link point is no longer data protected and the state of the source link point is updated to reflect that data protection is disabled.

It should be noted that data protection, as described herein, is an extension of the monitoring capability of the namespace plug-in functionality; as a result, in an exemplary embodiment, the remote agent 170 uses the namespace plug-in 175 for data protection in accordance with the invention. Moreover, a data protection module of the NSM library 380 may cooperate with the Monitor 340 and the namespace plug-in 175 of the remote agent to monitor the source share. Upon detecting a failure to the source share and assuming that the destination share does not exist, the components of the integrated management framework cooperate to create the destination share on the destination volume. The NSM server then automatically switches a namespace reference in the logical namespace from the source share to the destination share to thereby make the destination share available through the namespace.

Figure 6:
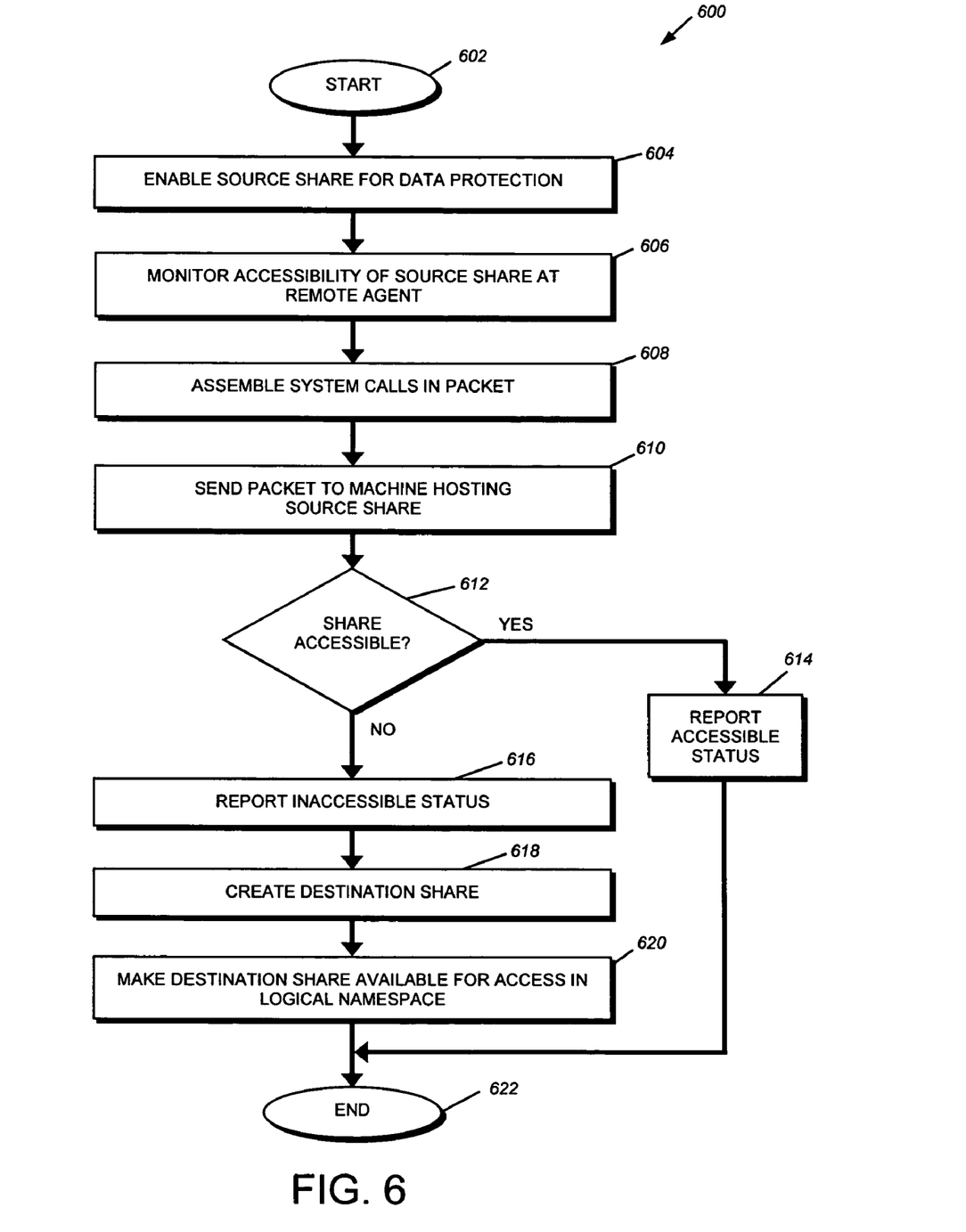
FIG. 6 is a flowchart illustrating a procedure for implementing data protection in the logical namespace of the storage system environment in accordance with an embodiment of the present invention.

FIG. 6 is a flowchart illustrating a procedure for implementing data protection in the logical namespace of the storage system environment in accordance with an embodiment of the present invention. The procedure 600 starts at Step 602 and proceeds to Step 604 where the source share on the source volume is data protection (DP) enabled to allow monitoring of its failure in the logical namespace. Illustratively, a user interacts with the NSM console to enable data protection of the source share, as described above. Upon being informed (e.g., by the NSM console) that the source share is DP-enabled, the Monitor 340 of the NSM server illustratively instructs the remote agent 170 to determine whether the share, e.g., a CIFS share, is accessible in the environment 100. Note that the scheduler 320 may periodically poll ("ping") the Monitor 340 to instruct the remote agent 170 to access the source share. That is, based on a predetermined schedule implemented by the scheduler, the Monitor instructs the remote agent to monitor the accessibility (health) of the source share in the logical namespace (Step 606) and to report back if the share fails (i.e. is inaccessible). In Step 608, the remote agent assembles system calls (e.g., Win32 APIs) within one or more (e.g., CIFS) packets and, in Step 610, sends the packet to the machine hosting the source share, instructing the machine to access the share. Illustratively, the CIFS source share may reside on a Windows machine or a NetApp filer; in either event, the remote agent uses Win32 APIs to communicate with a CIFS server on the machine/filer to access the share. An example of such an API is "open file" call.

In Step 612, a determination is made as to whether the path to the share is valid and, notably, whether the share is accessible. If the share (file) is accessible and can be, e.g., opened, the remote agent reports that accessible status to the NSM server in Step 614 and the procedure ends at Step 622. However, if the share is not accessible after repeated attempts as specified by, e.g., the retry-count parameter or a time out timer, the remote agent reports that inaccessible status to the NSM server in Step 616. In Step 618, the NSM server cooperates with the remote agent to create a destination share on the destination volume and, in Step 620, makes that destination share available for client access in the logical namespace by, e.g., replacing the source share with the destination share and linking the destination share into the namespace. The procedure then ends at Step 622.

In the illustrative embodiment, the NSM server 200 replaces the inaccessible source (CIFS) share with the destination share in the logical namespace by, e.g., exporting a folder on the destination mirror as the destination share. That is, the NSM server communicates with the remote agent 170 (using APIs) to create the destination (CIFS) share on the destination mirror and then inserts that share into the logical namespace by, e.g., issuing a (DFS) system call to the remote agent to create a new entry in the namespace. Similarly, the NSM server inserts a share (or link point to the share, such as the source share) into the logical namespace by issuing a DFS system call to the remote agent to create an entry for that share in the namespace. In response, the namespace plug-in 175 of the remote agent cooperates with a DFS server to access the namespace and insert the new entry according to a conventional DFS procedure.

Notably, the source CIFS share (e.g., a primary DFS target) can be data protected so that if the primary target fails (is inaccessible), the NSM server automatically switches over to the mirrored DFS link. That is, in response to a failure and corresponding failover operation, the primary DFS target is removed from the logical namespace and the destination CIFS share on a destination filer is installed as the secondary target for the DFS link. The NSM server performs the failover operation and instructs the remote agent to provide the pathname for the destination CIFS share to the DFS server, which links that secondary DFS target to the DFS link.

Advantageously, the present invention provides an easy and efficient way to create a reusable failover policy that may be associated with link points in the logical namespace. Specifically, the invention automatically detects a failure of a managed data object (e.g., a primary share) and causes its link point to failover to a backup copy of data (e.g., a secondary share). The invention further allows a user to specify a policy that can be associated with several link points, thereby reducing repetition of tasks and rendering administration substantially easier.

The foregoing description has been directed to specific embodiments of this invention. It will be apparent, however, that other variations and modifications may be made to the described embodiments, with the attainment of some or all of their advantages. For instance, it is expressly contemplated that the procedures, processes and/or modules described herein may be implemented in hardware, software, embodied as a computer-readable medium having program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for implementing a data protection policy in a logical namespace of a storage system environment comprising:

monitoring failures of a primary data object in the logical namespace at a managed data object level utilizing a data protection policy wherein the data protection policy is applied to one or more data protected link points to specify the failover action to be taken on each link point;

in response to a failure to the primary data object, communicating with a remote agent to create a secondary data object on a destination mirror by utilizing data previously mirrored from the failed data object, wherein creating the secondary data object enables failover for a data protected link point to the primary data object via the data protection policy;

in response to creating the secondary data object on the destination mirror, inserting the secondary data object into the logical namespace by issuing a system call to the remote agent to create a new entry in the logical namespace; and linking the secondary data object to the data protected link point in the logical namespace to specify the failover action to be taken on the data protected link point.

2. The method of claim 1 wherein the managed data object level is a share level.

3. The method of claim 2 wherein the primary data object is a primary share and wherein the secondary data object is a secondary share.

4. The method of claim 1 further comprising:
creating a data protection policy that specifies failover characteristics when the primary data object is inaccessible; and
applying the data protection policy on the link point to the primary data object.

5. The method of claim 4 wherein creating the data protection policy comprises:
assigning a name to the data protection policy;
specifying automatic failover for the primary data object when the failure is detected; and
specifying a number of times to probe the primary data object before rendering the primary data object as failed.

6. The method of claim 4 wherein applying the data protection policy comprises:
associating the primary data object link point with the primary data protection policy;
specifying a mirroring relationship between the primary data object and the secondary data object; and
assigning a name to the secondary data object.

7. The method of claim 6 wherein linking comprises replacing the link point for the primary data object with the link point for the secondary data object in the logical namespace.

8. A system configured to implement data protection in a logical namespace of a storage system environment comprising:
a namespace and storage management (NSM) console configured to interact with a user to enable a data protection of a source share in the environment;
a remote agent installed on a host machine of the environment, the remote agent having a namespace plug-in module, the namespace plug-in module including a monitoring capability for use in data protection; and
an NSM server configured to cooperate with the NSM console and the remote agent to monitor the source share for failure utilizing a data protection policy wherein the data protection policy is applied to one or more data protected link points to specify the failover action to be taken on each link point, communicate with the remote agent to create a destination share on a destination mirror by utilizing data previously mirrored from the failed source share in response to a failure of the source share via the data protection policy, and insert the destination share into the logical namespace by issuing a system call to the remote agent to create a new entry in the logical namespace in response to creating the destination share on the destination mirror,
wherein creating the destination share enables failover for one or more data protected link points to the primary data object.

9. The system of claim 8 wherein the source share resides on a source volume of a data replication event in the environment and wherein the destination share resides on a destination volume of the data replication event.

10. The system of claim 9 wherein, in response to the failure, the NSM server is further configured to switch a namespace reference in the logical namespace from the source share to the destination share to thereby make the destination share available through the namespace.

11. The system of claim 8 further comprising a Monitor of the NSM server, the Monitor configured to instruct the remote agent to determine whether the source share is accessible.

12. The system of claim 11 further comprising a scheduler of the NSM server, the scheduler configured to poll the Monitor to instruct the remote agent to access the source share.

13. The system of claim 12 wherein, in response to instructions from the Monitor, the remote agent is configured to send a system call to access the source share to a machine hosting the source share.

14. The system of claim 13 wherein the system call is an open file call.

15. Apparatus configured to implement data protection in a logical namespace of a storage system environment, the apparatus comprising:
means for monitoring failures of a primary data object in the logical namespace at a managed data object level utilizing a data protection policy wherein the data protection policy is applied to one or more data protected link points to specify the failover action to be taken on each link point;
means for communicating with a remote agent to create a secondary data object on a destination mirror by utilizing data previously mirrored from the failed primary data object wherein creating the secondary data object enables failover for a data protected link point to the primary data object via the data protection policy in response to a failure to the primary data object;
means for inserting the secondary data object into the logical namespace by issuing a system call to the remote agent to create a new entry in the logical namespace in response to creating the secondary data object on the destination mirror; and
means for linking the secondary data object to the data protected link point in the logical namespace to specify the failover action to be taken on the data protected link point.

16. The apparatus of claim 15 wherein the managed data object level is a share level.

17. The apparatus of claim 16 wherein the primary data object is a primary share and wherein the secondary data object is a secondary share.

18. The apparatus of claim 15 further comprising:
means for creating a data protection policy that specifies failover characteristics when the primary data object is inaccessible; and
means for applying the data protection policy on the link point to the primary data object.

19. A computer readable medium containing executable program instructions executed by a processor, comprising:
program instructions that monitor failures of a primary data object in a logical namespace at a managed data object level utilizing a data protection policy wherein the data protection policy is applied to one or more data protected link points to specify the failover action to be taken on each link point;
program instructions that communicate with a remote agent to create a secondary data object on a destination mirror by utilizing data previously mirrored from the failed primary data object, wherein creating the secondary data object enables failover for a link point to the primary data object via the data protection policy in response to a failure to the primary data object;

program instructions that insert the secondary data object into the logical namespace by issuing a system call to the remote agent to create a new entry in the logical namespace in response to the creation of the secondary data object on the destination mirror; and program instructions that link the secondary data object to the link point in the logical namespace to specify the failover action to be taken on the data protected link point.

20. The computer readable medium of claim 19 further comprising one or more program instructions that:

create a data protection policy that specifies failover characteristics when the primary data object is inaccessible; and apply the data protection policy on the link point to the primary data object.

21. A method comprising:

providing a namespace service that supports a plurality of protocols operating on various file server platforms of a storage system environment;

utilizing a namespace plug-in of the namespace service to protect a data object, the source data object available;

creating an entry for the data object in a logical namespace of the namespace service;

monitoring a primary data object for a failure utilizing a data protection policy wherein the data protection policy is applied to one or more data protected link points to specify the failover action to be taken on each link point;

in response to detecting a failure of the primary data object, communicating with a remote agent to create a secondary data object in a destination mirror by utilizing data previously mirrored from the failed primary data object, wherein creating the secondary data object enables failover for a data protected link point to the primary data object via the data protection policy;

in response to creating the secondary data object on the destination mirror, inserting the secondary data object into the logical namespace by issuing a system call to the remote agent to create a new entry in the logical namespace; and replacing the entry in the logical namespace for the primary data object with an entry for the secondary data object.

22. The method of claim 21 wherein the secondary data object is a replica of a failed primary data object.

23. The method of claim 21 further comprising:

creating a data protection policy that specifies failover characteristics when the primary data object is inaccessible.

24. A method, comprising:

storing a file on a source storage system;

storing a copy of the file on a destination storage system;

assigning a primary share to the file, wherein the primary share provides a link to the file in a logical namespace;

detecting a failure of the primary share utilizing a data protection policy wherein the data protection policy is applied to one or more data protected link points to specify the failover action to be taken on each link point;

in response to detecting a failure of the primary share, communicating with a remote agent to create secondary share on a destination mirror by utilizing data from previously mirrored from the failed primary share, wherein the secondary share provides a data protected link point to the copy of the file in the logical namespace;

in response to creating the secondary share on the destination mirror, inserting the secondary share into the logical namespace by issuing a system call to the remote agent to create a new entry in the logical namespace; and automatically switching a namespace reference in the logical namespace from the source share to the secondary share.

\* \* \* \* \*